United States Patent
Siessl et al.

(10) Patent No.: US 9,958,006 B2
(45) Date of Patent: May 1, 2018

(54) SPLIT BEARING ARRANGEMENT

(71) Applicant: Miba Sinter Austria GmbH, Laakirchen (AT)

(72) Inventors: Wolfgang Siessl, Traunkirchen (AT); Alexander Mueller, Altmuenster (AT); Martin Karlsberger, Eberstalzell (AT); Karl Dickinger, Vorchdorf (AT)

(73) Assignee: Miba Sinter Austria GmbH, Laakirchen (AT)

( * ) Notice: Subject to any disclaimer, the term of this patent is extended or adjusted under 35 U.S.C. 154(b) by 0 days. days.

(21) Appl. No.: 15/191,616

(22) Filed: Jun. 24, 2016

(65) Prior Publication Data
US 2017/0016479 A1    Jan. 19, 2017

(30) Foreign Application Priority Data
Jul. 14, 2015   (AT) ............... A 50621/2015

(51) Int. Cl.
*F16C 33/04* (2006.01)
*F16C 9/02* (2006.01)

(52) U.S. Cl.
CPC .............. *F16C 33/046* (2013.01); *F16C 9/02* (2013.01); *F16C 2226/10* (2013.01); *F16C 2226/60* (2013.01); *F16C 2240/30* (2013.01)

(58) Field of Classification Search
CPC .... F16C 9/02; F16C 9/04; F16C 9/045; F16C 17/022; F16C 33/046; F16C 33/60; F16C 35/02; F16C 35/04
See application file for complete search history.

(56) References Cited

U.S. PATENT DOCUMENTS

| | | | |
|---|---|---|---|
| 2,876,050 A | 3/1959 | Dulin | |
| 4,037,888 A * | 7/1977 | Mirjanic | F16C 35/00 384/434 |
| 8,690,439 B2 | 4/2014 | Dickinger et al. | |
| 9,273,733 B2 | 3/2016 | Draxler et al. | |
| 2013/0146018 A1 * | 6/2013 | Brautigam | F16C 9/02 123/195 R |

FOREIGN PATENT DOCUMENTS

| | | |
|---|---|---|
| AT | 507 265 A1 | 3/2010 |
| DE | 834 624 C | 3/1952 |
| DE | 11 2013 002 230 T5 | 1/2015 |

* cited by examiner

Primary Examiner — James Pilkington
(74) Attorney, Agent, or Firm — Collard & Roe, P.C.

(57) ABSTRACT

The invention relates to a split bearing arrangement (1) with a bearing block (2) comprising counter clamping surfaces (5) and a bearing cover (3) comprising clamping surfaces (4), wherein the bearing cover (2) is connected to the bearing block (3) by means of bolt-like connecting elements mounted in bores (8) in the clamping surfaces (4) and/or comprising at least one projection (13) per clamping surface (4), which can be pushed into the counter clamping surface (5) of the bearing block (2), wherein the clamping surfaces (4) of the bearing cover (2) or the counter clamping surfaces (5) of the bearing block (2) are oriented obliquely at an angle not equal to 90° to the longitudinal extension of the connecting elements and/or the projections (13) are arranged respectively at a distance (16) of at least 150% of a maximum height (17) of the projections (19) over the clamping surfaces (4) from the bore (8) and/or a side wall of the bearing cover (3).

5 Claims, 2 Drawing Sheets

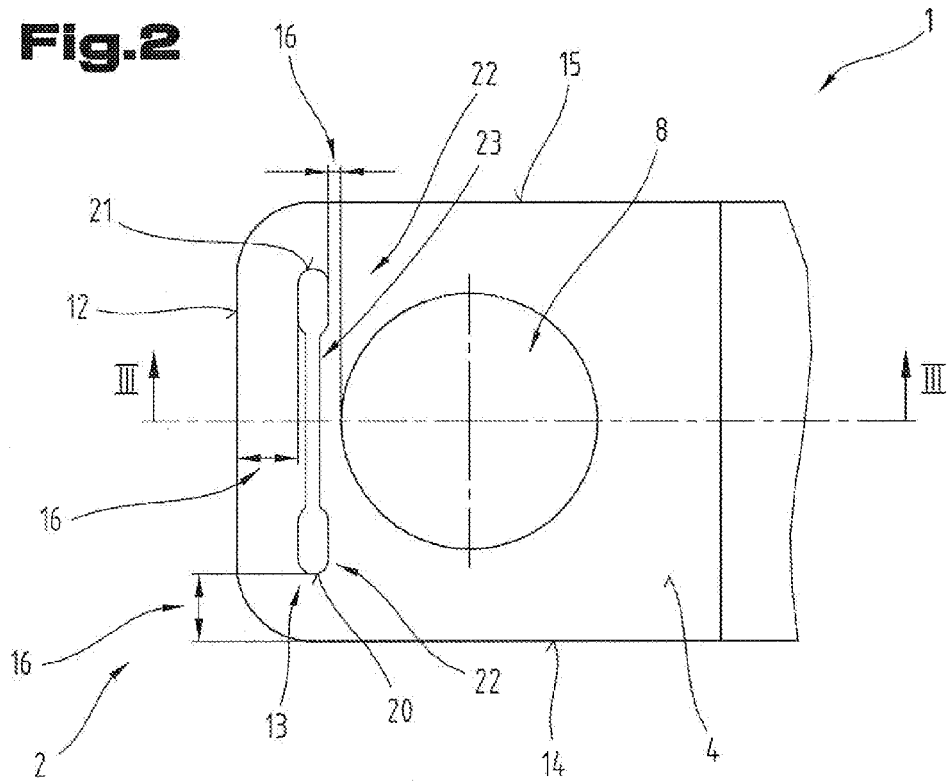
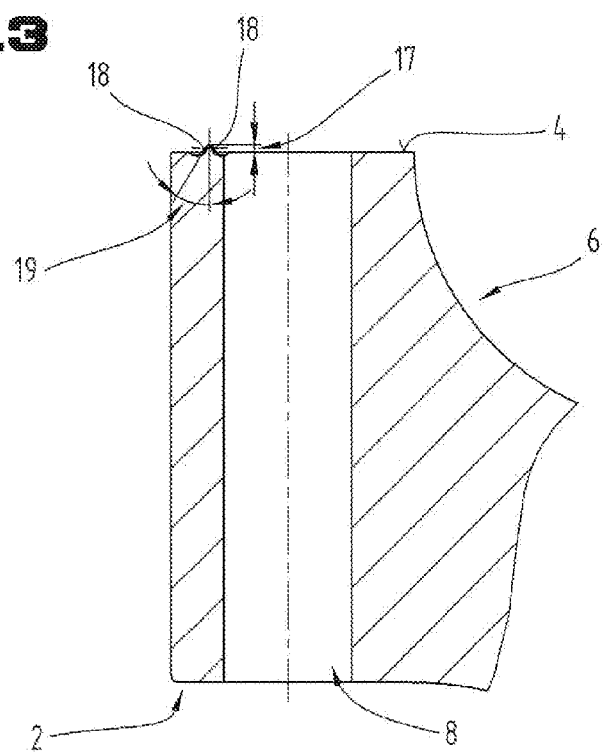

SPLIT BEARING ARRANGEMENT

CROSS REFERENCE TO RELATED APPLICATIONS

Applicant claims priority under 35 U.S.C. § 119 of Austrian Application No. A 50621/2015 filed on Jul. 14, 2015, the disclosure of which is incorporated by reference.

BACKGROUND OF THE INVENTION

1. Field of the Invention

The invention relates to a split bearing arrangement comprising a bearing block and a bearing cover, wherein the bearing cover has clamping surfaces, which in the assembled state of the bearing arrangement bear on counter clamping surfaces of the bearing block, and the bearing cover with the bearing block are connected by bolt-like connecting elements with a longitudinal extension, wherein the bolt-like connecting elements are partly received in bores in the clamping surfaces of the bearing cover, and wherein the counter clamping surfaces of the bearing block or the clamping surfaces of the bearing cover are oriented perpendicularly to the longitudinal extension of the connecting element, and/or with at least one projection for each clamping surface which can be pushed into the counter clamping surface of the bearing block.

2. The Prior Art

Split bearing arrangements comprising a bearing block and a bearing cover are known from the prior art, for example for supporting a crankshaft. The bearing cover is screwed to the bearing block by screw bolts. Provided the bearing cover is not separated from the bearing block by breaking but is made separately, the clamping surfaces on the bearing cover and the counter clamping surfaces on the bearing block are usually designed to be flat, i.e. they are designed to be perpendicular to the screw bolts (at an angle of 90°).

However, the prior art has already described designing the clamping surfaces and the counter clamping surfaces to be oblique to the screw bolt longitudinal axes. Reference is made to DE 834 624 B. By means of the obliquely positioned fitting surfaces the dividing plane of the bearing arrangement is prevented from opening during operation. Furthermore, it should also be ensured in this way that the bearing arrangement can be assembled again precisely after boring the bearing.

For the latter purpose it is also known from the prior art, for example from AT 507 265 A1, to arrange split bearing arrangement projections on clamping surfaces of bearing covers.

SUMMARY OF THE INVENTION

The underlying objective of the present invention is to reduce the mechanical load of sliding bearings caused by the split bearing arrangement which sliding bearings are held in the bearing arrangement.

The objective is achieved in the aforementioned bearing arrangement in that the clamping surfaces of the bearing cover are oriented obliquely at an angle not equal to 90° to the longitudinal extension of the connecting elements, with the proviso that with obliquely running clamping surfaces the counter clamping surfaces are oriented perpendicularly to the longitudinal extension of the connecting elements and with obliquely running counter clamping surfaces the clamping surfaces are oriented perpendicularly to the longitudinal extension of the connecting elements, and/or in that in the embodiment of the bearing cover with the at least one projection per clamping surface said projections are each arranged at a distance of at least 150% of a maximum height of the projections over the clamping surfaces of the bore and/or a side wall of the bearing cover.

It is an advantage here that by means of this/these configuration(s) of the bearing cover tensions in the bearing housing can be reduced, whereby also the forces and tensions introduced into the sliding bearing or bearings can be reduced due to the tension of the bearing cover with the bearing block. The sliding bearing or bearings can thus be held more gently in the bearing housing, whereby its lifetime can be increased.

This effect is particularly pronounced, if according to one embodiment the clamping surfaces of the bearing cover are designed to slope obliquely downwards beginning from a bearing housing. In addition, with this embodiment of the bearing arrangement the opening of the dividing plane of the bearing arrangement can be avoided more effectively in the region of the sliding bearing or bearings during operation due to the greater pressing.

Preferably, the angle is selected from a range of 0.01° to 2°, whereby also an improvement of the said effect can be achieved.

According to another embodiment of the bearing arrangement it is possible that the projections have side surfaces, wherein the side surfaces are oriented at an angle to the normal on the clamping surface, which is selected from a range of 30° to 170°. Although in fact more acute angles would be better for penetrating the projections into the counter clamping surfaces, it has been shown in the overall system that a more obtuse angle is an advantage due to the lower tensions produced for the arrangement of the sliding bearing or bearings.

It is also possible that the projections are designed to be strip-like with a longitudinal extension and with an at least approximately triangular cross-section—as viewed in the direction of the longitudinal extension. In this way there can be a more even distribution of tension in the material of the bearing block in the region of the counter clamping surfaces.

According to a further embodiment of the bearing arrangement it is possible that the projections are designed to be at least partly rounded, whereby also smaller tensions can be induced in the material of the counter clamping surfaces.

To improve this effect further it is possible that the rounding has a radius which is selected from a range with a lower limit of 0.1 mm and an upper limit of 50 mm.

An improved tensioning of the clamping surfaces with the counter clamping surfaces and thus a greater security against opening the dividing plane can still be achieved despite lower tensions in the material of the counter clamping surfaces, if the strip-like projections each have two end sections and a middle section, wherein at least one of the end sections of each projection is designed to be wider than its middle sections.

BRIEF DESCRIPTION OF THE DRAWINGS

For a better understanding of the invention the latter is explained with reference to the following Figures.

In a simplified, schematic representation:

FIG. 2 shows a section of a bearing cover in plan view;

FIG. 3 shows a section of the bearing cover according to the section line III-III in FIG. 2.

DETAILED DESCRIPTION OF THE PREFERRED EMBODIMENTS

Figure 1:
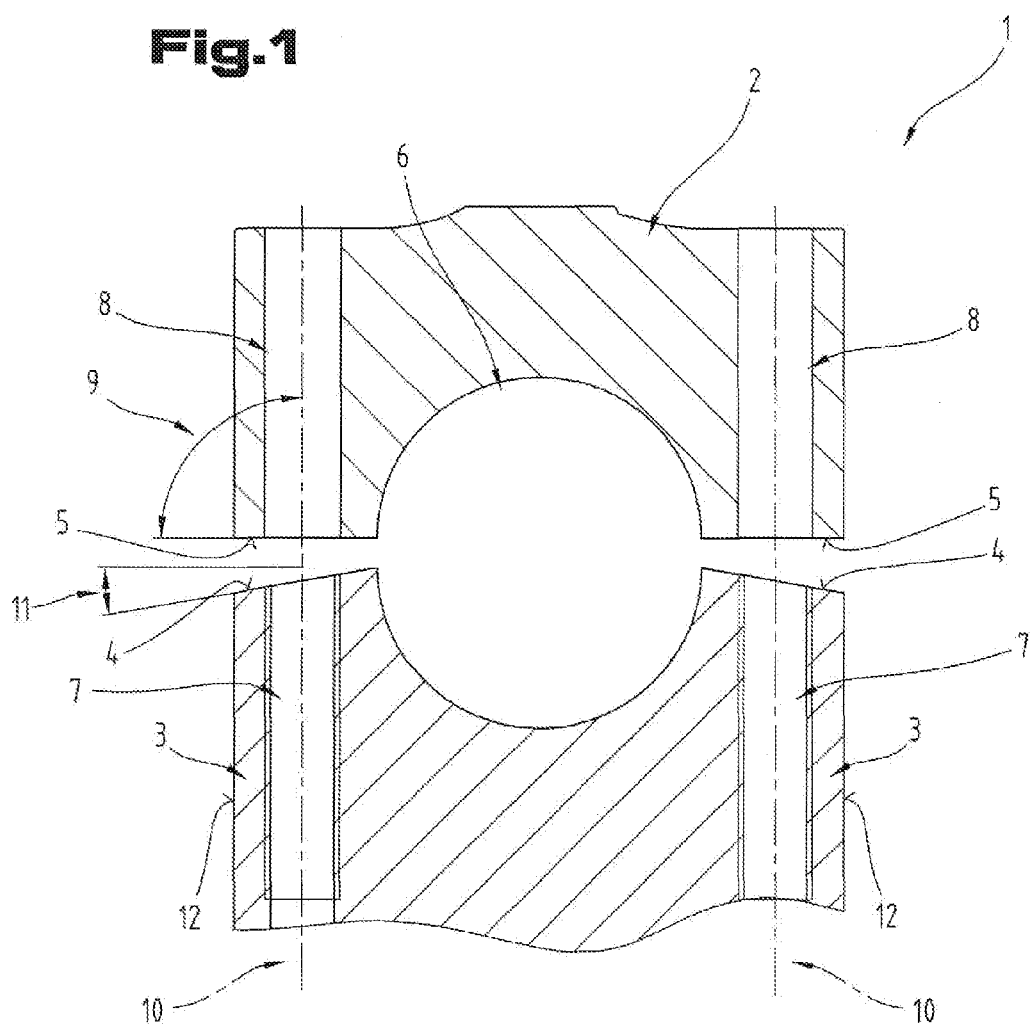
FIG. 1 shows a split bearing arrangement in front view.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented FIG. and in case of a change in position should be adjusted to the new position.

FIG. 1 shows a split bearing arrangement 1, as used for example in a machine housing of a reciprocating engine. Said bearing arrangement 1 comprises a bearing block 2 and a bearing cover 3. The bearing cover 3 comprises at its two distal end sections respectively a clamping surface 4 and the bearing block 2 at its two end sections comprises counter clamping surfaces 5 opposite the clamping surfaces 4. Between the bearing block 2 and the bearing cover 3 in the assembled state a peripherally closed bearing housing 6 is formed. In the bearing housing 6 sliding bearings can be held, for example sliding bearing half-shells, by means of which a shaft can be supported. Instead of arranging separate sliding bearings the sliding bearing can also be formed by directly coating the surface of the bearing housing 6 with a corresponding sliding bearing material.

FIG. 1 shows the bearing arrangement in a non-assembled state. For clamping together the bearing block 2 and the bearing cover 3 in the clamping surfaces 4 of the bearing cover 3 a through bore 7 is arranged respectively. In said bore 7 a bolt-like connecting element, not shown in more detail, in particular a screw bolt, is mounted, wherein by means of corresponding nuts, which are arranged on the connecting elements on the areas of the bearing cover 3 opposite the clamping surfaces 4, pretensioning is achieved. In the bearing block 2 blind bores 8 for receiving the connecting element are formed in the counter clamping surfaces 5. There are however also other methods for clamping together the bearing cover 3 and the bearing block 2. In the clamped together state one clamping surface 4 bears on the corresponding opposite counter clamping surface 5.

The counter clamping surfaces 5 of the bearing block 2 are perpendicular, i.e. oriented at an angle 9 of 90°, to a longitudinal central axis 10 of the blind bores 8 (and thus also to the longitudinal central axis 10 of the bores 7 of the bearing cover 3), i.e. in relation to the longitudinal extension of the connecting elements in the direction of said longitudinal central axis 10.

According to a first embodiment of the bearing arrangement 1, unlike such embodiments of the counter clamping surfaces 5 of the bearing block 2, the clamping surfaces 4 of the bearing cover 3 are designed to run obliquely to the longitudinal central axis 10, and thus to the longitudinal extension of the connecting elements, i.e. at an angle 11 which is not equal to 90°. The clamping surfaces 4 thus also run obliquely to the counter clamping surfaces 5 of the bearing block 2.

Preferably, the angle 11 is selected from a range of 0.01° to 2° in particular from a range of 0.01° to 1.5°.

Although it is possible in principle that the clamping surfaces 4 are designed to be inclined obliquely upwards, the preferred embodiment of the bearing arrangement 1 is to design the clamping surfaces 4 of the bearing cover 3 to drop away beginning from the bearing housing 6 obliquely outwards in the direction of the side surface 12 of the bearing cover 3.

The clamping surfaces 4 are preferably inclined in contrary directions.

By clamping together the bearing cover 3 and the bearing block 2 by means of the connecting elements firstly the highest areas of the clamping surfaces 4, i.e. in the preferred embodiment the areas of the clamping surfaces 4 which adjoin the bearing housing 6, bear on the counter clamping surfaces 5 of the bearing block 2. By means of further clamping the bearing cover 4 is drawn so far in the direction of the counter clamping surfaces 5 that also the remaining areas of the clamping surfaces 4 of the bearing cover 3 bear on the respective counter clamping surfaces 5, so that the dividing plane formed between the bearing block 2 and the bearing cover 3 is closed at least almost fully, in particular completely, in this way a greater clamping force is exerted on the highest areas of the clamping surfaces 4 and thus in said areas a greater tension is induced compared with the remaining areas of the clamping surfaces 4.

In the assembled state of the bearing arrangement 1 the clamping surfaces 4 of the bearing cover 3 bear at least almost fully, in particularly completely, without a gap on the counter clamping surfaces 5 of the bearing block 2.

According to one embodiment it is possible that the clamping surfaces 4 are not designed to be completely oblique, as shown in FIG. 1. It is also possible that the clamping surfaces 4 are designed to be oblique only over a portion of their extension and the remaining areas such as the counter clamping surfaces 5 of the bearing block 2 are oriented to be orthogonal to the longitudinal central axis 10 of the bore 7.

It is also possible that the clamping surfaces 4 are designed respectively to be inclined with more than one angle of inclination against the counter clamping surfaces 5 of the bearing block 2. Thus the area of the clamping surfaces 4 adjoining the bearing housing 6 are designed to be inclined by the said angle 9. An adjoining area can be designed to be inclined at an angle which is smaller than said angle 9. If necessary the areas adjoining the side surfaces 12 can be designed to have an angle of inclination of zero so that said areas are oriented orthogonally to the longitudinal central axes 10, i.e. parallel to the counter clamping surfaces 5 of the bearing block 2. In an extreme case the clamping surfaces 5 of the bearing cover 3 can be designed to be convexly curved (as viewed from the front).

In principle, also a concave curvature of the clamping surfaces 4 is possible wherein in this case it is preferable to form the highest areas of the clamping surfaces 4 on the bearing housings 6.

It should be noted that also a reverse embodiment of the bearing arrangement 1 is possible, in that the counter clamping surfaces 5 of the bearing block 2 are designed to be oblique and the clamping surfaces 5 of the bearing cover 3 are designed to be orthogonal to the longitudinal central axis 10 of the bore 7 and the blind bore 8. The above explanations about the clamping surfaces 4 of the bearing cover 3 are adapted accordingly in this case for the counter clamping surfaces 5.

FIGS. 2 and 3 show a section of a further and possibly independent embodiment of the bearing arrangement 1 in plan view on one of the two clamping surfaces 4, wherein the same reference numerals and component names have been used for the same parts as in FIG. 1. To avoid unnecessary repetition reference is made to the detailed description of FIG. 1.

In this embodiment of the bearing arrangement 1 at least one projection 13 is arranged projecting on and above the clamping surfaces 4, which projection in the assembled state of the bearing arrangement 1 is pushed into the counter clamping surface 5 of the bearing block 2 (FIG. 1) by clamping together the bearing block 2 and bearing cover 3.

Also such a projection 13 is arranged on the not shown second clamping surface 5. The following embodiments also apply to this projection 13, insofar as nothing different is described in particular.

The at least one projection 13 is designed to be strip-like with a longitudinal extension in the direction from a front side 14 to a rear side 15 of the bearing cover 3. Furthermore, the at least one projection 13 is arranged as viewed in plan view between the side surface 12 and the bore 7.

The at least one projection 13—as viewed in plan view—is arranged at a distance 16 of at least 150% of a maximum height 17 of the projection 13 over the clamping surfaces 4 from the bore 8 and/or a side wall, i.e. the side surface 12 or the front side 14 and the rear side 15 and the side surface 12, of the bearing cover 2, in particular, the distance 16 is between 0.5 mm and 10 mm. The distance 16 from the bore 6 is measured—as viewed in plan view—from the point that is closest to the side surface 12.

Preferably, the distance 16 from the front side 14 is equal to the distance from the rear side 15. It is also preferable if the distance 16 from the side surface 12 is equal to the distance 16 from the bore 8. Particularly preferably, all of the distances 16 mentioned in this paragraph are of equal size.

The projection 13 has side surfaces 18. According to one embodiment of the bearing arrangement it is possible that the side surfaces 18 are oriented at an angle 19 to the normal on the clamping surface 4, which is selected from a range of 30° to 170°, in particular from a range of 40° to 150°. In this case the two side surfaces 18 can be designed to be inclined with the same absolute value of the angle 19, so that the projection has a symmetrical cross-section. However, it is also possible that the side surface 18 of the projection 13 closer to the side surface 12 of the bearing cover 3 is inclined at a different angle 19 to the normal on the clamping surface than the side surface 18 of the projection closer to the bearing housing 6, although this is not the preferred embodiment.

According to a further embodiment of the bearing arrangement it is possible that the strip-like projection 13 has an at least approximately triangular cross-section, as shown in FIG. 3, in this case it is an advantage if according to a preferred embodiment the tip is designed to be rounded, as also shown in FIG. 3. Said rounding can have a radius according to a further embodiment which is selected from a range of 0.1 mm to 50 mm, in particular from a range of 0.5 mm to 30 mm.

In principle, the projection 13 can also have a different cross-section, for example an at least approximately trapezoidal cross-section.

Preferably, also a front side 20 pointing in the direction of the front side 14 and a rear side 21 of the projection 13 pointing in the direction of the rear side 15 is designed to be inclined forming an acute angle with the clamping surface 4.

According to a further preferred embodiment of the bearing arrangement 1 the strip-like projection 13 comprises two end sections 22 and a middle section 23, wherein at least one of the end sections 22, preferably both end sections 22, is designed to be wider than the middle section 23, as viewed in plan view, as shown in FIG. 1. The projection can thus be designed to be bone-like.

If only one end section 22 is wider than the middle section 23 or an end section 22 is wider than the second end section 22 of a projection 13, it is an advantage if the wider end section 22 of the first clamping surface 4 is arranged closer to the front side 14 and the wider end section 22 of the second clamping surface 4 of the bearing cover 3 is closer to the rear side 15. In this way an axial displacement of the bearing cover 3 relative to the bearing block 2 is more easily avoided during the operation of the bearing arrangement 1.

In addition to the embodiment of the projection 13 shown in FIG. 2 it is also possible that two (or more) projections 13 are arranged behind one another in a direction from the front side 14 to the rear side 15 of the bearing cover 3, so that the projection 13 shown in FIG. 2 does not have a middle section 23 for example.

In addition it is possible that at least one projection 13 is arranged in the area of the clamping surface 4 between the bore 8 and the bearing housing 6—as viewed in plan view.

The example embodiments show possible variants of the bearing arrangement, whereby it should be noted at this point that also various different combinations of the individual embodiments are possible. In particular, it is possible to arrange at least one of the described projections 13 at the described distances on the inclined clamping surface 4.

Finally, as a point of formality, it should be noted that for a better understanding of the structure of the bearing arrangement 1 the latter and its components have not been represented true to scale in part and/or have been enlarged and/or reduced in size.

LIST OF REFERENCE NUMERALS 1 bearing arrangement
2 bearing block
3 bearing cover
4 clamping surface
5 counter clamping surface
6 bearing housing
7 bore
8 blind bore
9 angle
10 longitudinal central axis
11 angle
12 side surface
13 projection
14 front side
15 rear side
16 distance
17 height
18 side surface
19 angle
20 front side
21 rear side
22 end section
23 middle section

The invention claimed is:

1. A split bearing arrangement comprising:
a bearing block comprising counter clamping surfaces;
a bearing cover comprising clamping surfaces, bores in the clamping surfaces, and at least one projection per clamping surface; and
connecting elements with a longitudinal extension, the connecting elements connecting the bearing block to the bearing cover;

wherein in the assembled state of the bearing arrangement the clamping surfaces of the bearing cover bear on the counter clamping surfaces of the bearing block and the at least one projection is pushed into the counter clamping surface of the bearing block;

wherein the connecting elements are partly received in the bores in the clamping surfaces of the bearing cover;

wherein the projections have a maximum height over the clamping surfaces of the bearing cover;

wherein the projections are arranged respectively at a distance of at least 150% of the maximum height from the bore of the bearing cover and/or from a side wall of the bearing cover;

wherein the projections are strips, each strip having two end sections and a middle section; and wherein both of the two end sections are wider than the middle section.

2. The bearing arrangement as claimed in claim 1, wherein the projections have side surfaces;
   wherein the side surfaces are oriented at an angle to the normal on the clamping surface; and
   wherein the angle to the normal is selected from a range of 30° to 170°.

3. The bearing arrangement as claimed in claim 1, wherein the strips have a longitudinal extension and an at least approximately triangular cross-section as viewed in the direction of the longitudinal extension.

4. The bearing arrangement as claimed in claim 1, wherein the projections are designed to be at least partly rounded.

5. The bearing arrangement as claimed in claim 4, wherein the rounding has a radius selected from a range with a lower limit of 0.1 mm and an upper limit of 50 mm.

* * * * *